D. S. STAFFORD.
Wheel Cultivator.
No. 31,133.
Patented Jan. 15, 1861.
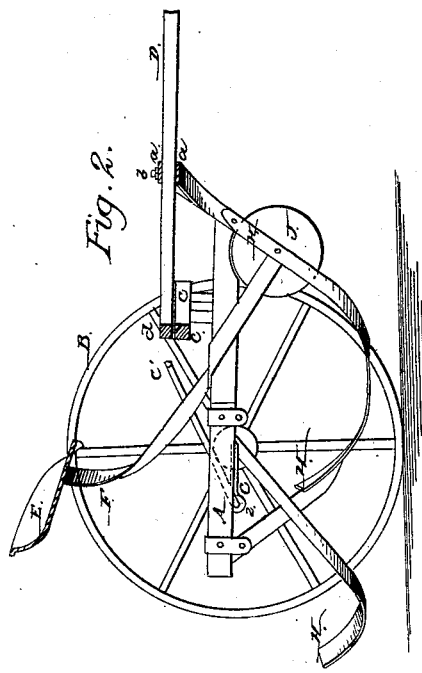
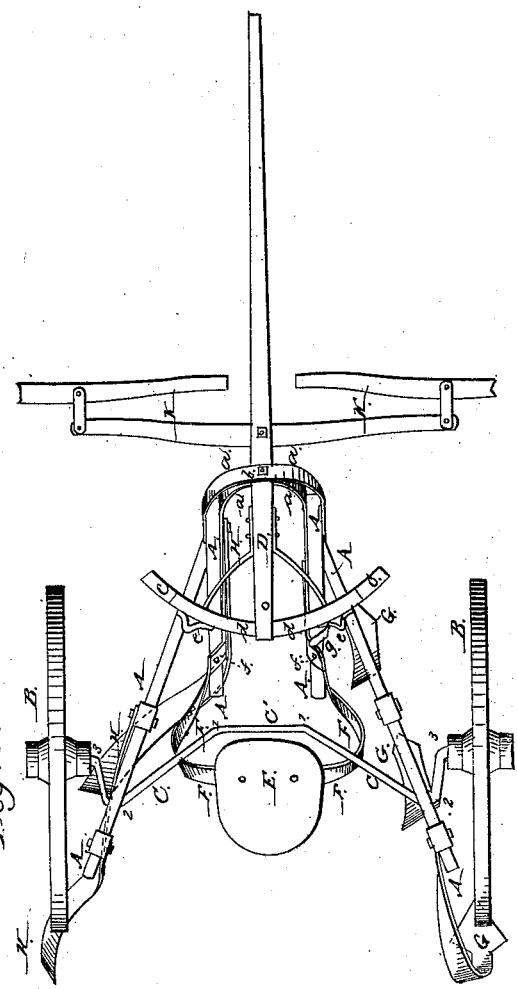
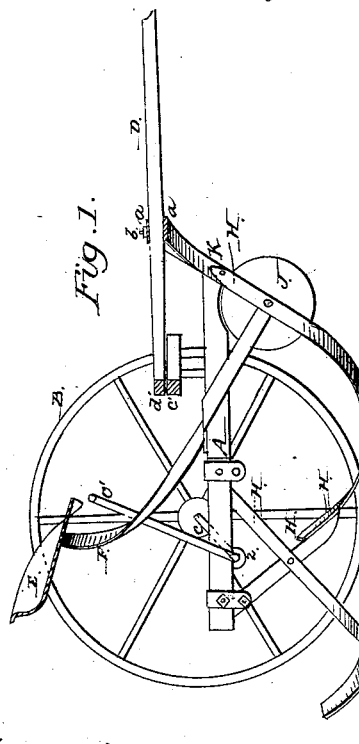
Witnesses:
E. Cohen
J. Hirsch
Inventor:
Daniel S. Stafford
Batty & B. Stoughton

UNITED STATES PATENT OFFICE.

DANIEL S. STAFFORD, OF DECATUR, ILLINOIS.

IMPROVEMENT IN CULTIVATORS.

Specification forming part of Letters Patent No. 31,133, dated January 15, 1861.

*To all whom it may concern:*

Be it known that I, DANIEL S. STAFFORD, of Decatur, in the county of Macon and State of Illinois, have invented a new and useful Improvement in Corn-Cultivators; and I do hereby declare the following to be a full, clear, and exact description of the same, reference being had to the accompanying drawings, making a part of this specification, in which—

Figure 1 represents a vertical longitudinal section through the cultivator with the cultivating-share let down, as when working. Fig. 2 represents a similar section with the shares raised up, as when moving from field to field or in passing over an obstruction. Fig. 3 represents a top plan of the cultivator.

Similar letters of reference, where they occur in the several figures, denote like parts of the cultivator in all the drawings.

My invention relates to that kind of cultivator that can be raised or lowered or turned to the right or left by the operator from his seat on the machine so as to adapt the machine for passing over or turning to one side of an obstruction, or to cause it to follow the crooks in the rows of plants; and my invention consists, first, in the manner of connecting the tongue to the main frame, so that the operator from his seat may with his feet cramp the frame and wheels on said tongue, to cause the shares or plows to run to the right or left, as the case may be; second, in the arrangement of the seat and axle, so that the axle itself becomes the lever by which it raises or lowers the main frame upon itself through the aid of the operator from his seat; and, third, to the particular form and construction of the cultivating shares or plows.

To enable others skilled in the art to make and use my invention, I will proceed to describe the same with reference to the drawings.

A represents the main frame of the cultivator, which is supported on the wheels B through the instrumentality of a bent axle, C, of peculiar form. The fronts of the main frame are united by two bows, $a\ a$, between which the tongue D passes, and to which said tongue is pivoted at $b$. On the main frame there is fastened a segment, $c$, and on the rear end of the tongue there is another segment, $d$, which rests and moves upon the one, $c$, on said frame.

On the convex or rear side of the segment $d$ are two projections or stirrups or braces, $e\ e$, against which the operator in his seat E may place his feet, both as a support and for the purpose of cramping the main frame on the tongue. The seat E is hung on a piece of bent metal, F, that forms a spring, the ends of said spring being fastened at $f\ f$ to the main frame. The axle on each side of its center has three bends or angles in it, 1 2 3, so that it will become a lifting-lever for the main frame, which is united to it at the bends or angles 2 2; and that the driver or operator from his seat may readily raise or lower the main frame on the axle, the central portion $C'$ of the axle comes forward of the driver's seat, where he may readily grasp and operate it. When the axle is forced down upon the frame it raises up the frame, as in Fig. 2, and a catch, $g$, Fig. 3, may there hold said axle, which catch, too, when it is necessary to let down the plows or cultivator shares or teeth, can be thrown off by the foot of the driver, leaving him the free use of his hands to manage his team.

On one side of the main I have shown ordinary cultivator-plows, G, while on the other side I have shown shares H, made of thin bent metal, that have a rounded scooping edge for cutting through or under the soil, and the bend of these cutters at their rears throws the pulverized soil toward the plants.

The tongue is elevated high enough to pass over the corn or other plant cultivated by it, and supporting-wheels J J may be used on the under side and front of the main frame to prevent it from dropping too low.

K are the double-trees, the tongue, &c., being arranged for a center-draft machine, the horses walking one on each side of the row that is being cultivated. The driver may with his foot pressed upon the portion $C'$ of the axle raise up the main frame, thus leaving him his hands entirely to manage his team, doing everything else with his feet, and causing the cultivator to follow the rows of plants and the crooks therein without plowing out those that are slightly out of line.

Having thus fully described the nature and object of my invention, what I claim is—

1. In combination with the driver's seat and a tongue pivoted to the main frame, the arc $d$, with its projections or braces $e\ e$, so that the driver may from his seat cramp the main frame on the tongue to cause it to follow the crooks in the row of plants, substantially as described.

2. In combination with the seat and the main frame, the construction and arrangement of the bent axle, for the purpose of allowing the driver to use the axle itself as a lever to raise or lower the frame upon itself, substantially as described.

3. The long bent share blades or cutters H, for the purpose of cutting under and throwing the loosened soil toward the plants, when combined and arranged with a frame such as herein described and represented.

D. S. STAFFORD.

Witnesses:
 A. B. STOUGHTON,
 I. HIRSCH.